T. C. JOHNSON.
MILITARY SHOULDER ARM.
APPLICATION FILED DEC. 6, 1915.
1,173,582.
Patented Feb. 29, 1916.
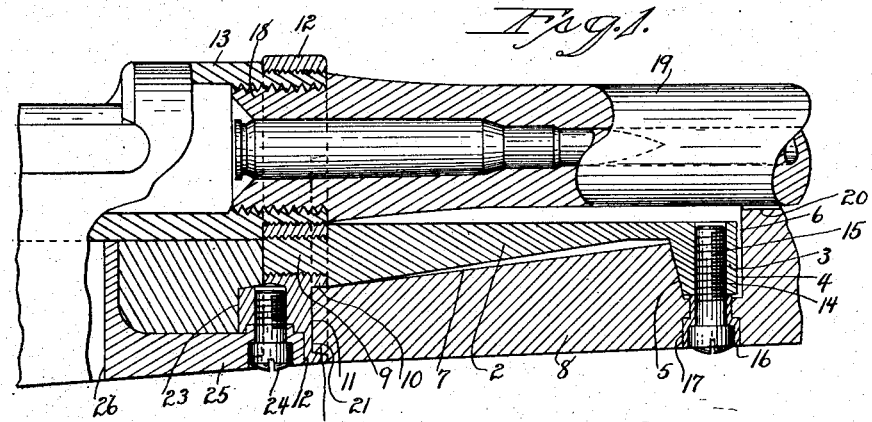
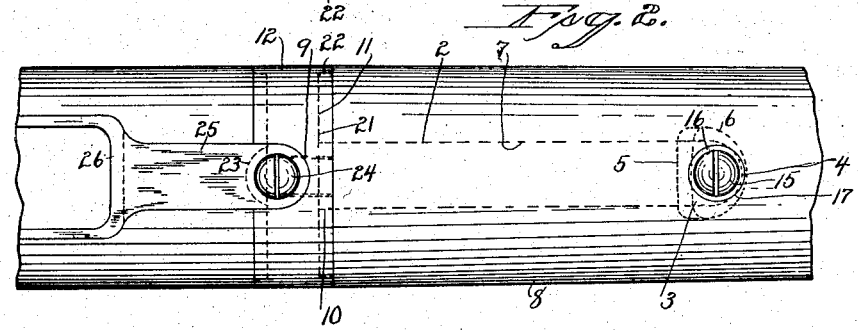
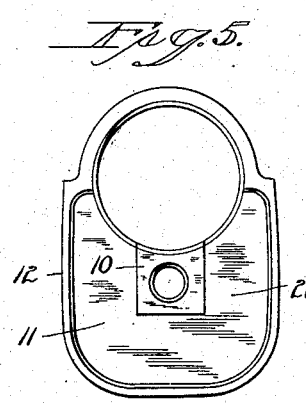
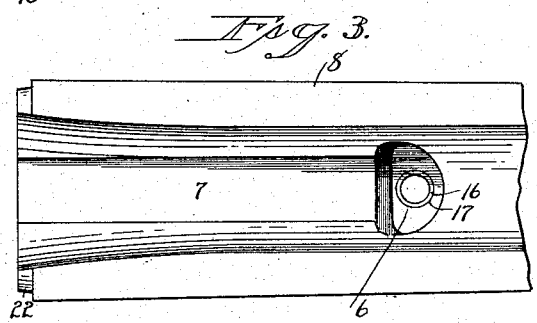
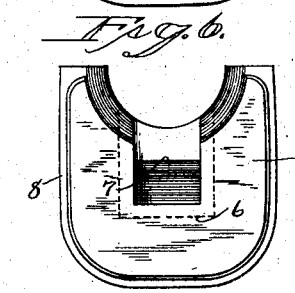
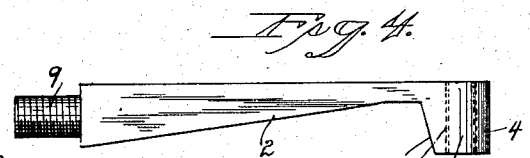

UNITED STATES PATENT OFFICE.

THOMAS C. JOHNSON, OF NEW HAVEN, CONNECTICUT, ASSIGNOR TO WINCHESTER REPEATING ARMS CO., OF NEW HAVEN, CONNECTICUT, A CORPORATION.

MILITARY SHOULDER-ARM.

1,173,582. Specification of Letters Patent. Patented Feb. 29, 1916.

Application filed December 6, 1915. Serial No. 65,238.

*To all whom it may concern:*

Be it known that I, THOMAS C. JOHNSON, a citizen of the United States, residing at New Haven, in the county of New Haven and State of Connecticut, have invented a new and useful Improvement in Military Shoulder-Arms; and I do hereby declare the following, when taken in connection with the accompanying drawings and the characters of reference marked thereon, to be a full, clear, and exact description of the same, and which said drawings constitute part of this application and represent, in—

Figure 1 a view partly in section, and partly in right hand side elevation of the middle portion of a military shoulder-arm constructed in accordance with my invention. Fig. 2 a broken reverse plan view thereof. Fig. 3 a broken plan view of the rear end of the forestock. Fig. 4 a detached side view of the forearm tie-piece. Fig. 5 a detached view in front elevation of the receiver-extension. Fig. 6 a view in rear elevation of the forestock.

My invention relates to an improvement in military shoulder-arms, the object being to provide simple and reliable means for holding the forestock against forward displacement without imposing any strain upon the barrel of the arm.

With these ends in view, my invention consists in a military shoulder-arm having certain details of construction as will be hereinafter described and pointed out in the claims.

In carrying out my invention as herein shown, I employ a forestock tie-piece consisting of a shank 2 formed at its forward end with a depending wedge-like locking-lug 3 having a rounded forward face 4 and a beveled rear face 5, and adapted to be entered into a vertical locking-recess 6 of corresponding form, leading downward out of the bottom of the forward end of a longitudinal clearance groove 7 formed in the upper face of the rear end of the forestock 8. At its rear end, the said shank 2 is provided with a threaded stem 9 which is screwed into a threaded bore formed in a lug 10 located upon the forward face 11 of a receiver-extension 12 which is screwed to the forward end of the receiver 13. In order to increase the length of the locking-lug 3 and hence enlarge its hold upon the beveled rear face 5 of the locking-recess 6 without cutting the same so deep as to weaken the forestock 8, the shank 2 is reduced in thickness at its forward end as plainly shown in Figs. 1 and 4, whereby the forward end of the said shank is made to some extent flexible. Now to prevent it from vertical displacement at its forward end, its locking-lug 3 is formed with a vertical, threaded bore 14 for the reception of the upper end of a screw 15 which draws the wedge-like locking-lug 3 down snugly into its locking position in the locking-recess 6. The outer end of the screw 15 is entered into a shouldered bushing or escutcheon 16 flushed into a shouldered chamber 17 formed in the lower face of the forestock in line with the recess 6 the bottom of which it intersects.

The receiver-extension 12 is formed with a threaded opening receiving the shank 18 of the gun-barrel 19, from which the forestock is preferably cleared by a space 20. The forward face of the receiver-extension contains a shallow recess 21 for the reception of a short tenon 22 upon the rear end of the forestock. The rear face of the receiver-extension, as shown, is formed with a lug 23 receiving a vertical screw 24 passing upward through the forward tang 25 of the box-magazine 26.

Under the construction described, the forestock tie-piece 2 firmly holds the forestock against forward longitudinal displacement. So far as my present invention is concerned, the receiver-extension 12 might be made integral with the receiver 13. The term "receiver" in the claims is to be understood as covering the receiver, whether its extension is integral or otherwise, except in those claims in which the receiver-extension is specifically mentioned.

I claim:—

1. In a military shoulder-arm, the combination with the receiver thereof, of a forestock formed in the upper face of its rear end with a longitudinal clearance groove having a vertical locking-recess leading downward from its forward end, a forestock tie-piece located in the said longitudinal groove and formed at its forward end with a locking-lug entering the said recess and connection at its rear end with the receiver, and a screw passing upward through the forestock and into the said lug for seating the same firmly in the said recess.

2. In a military shoulder-arm, the combination with the receiver thereof, of a receiver-extension, a forestock formed in the upper face of its rear end with a longitudinal groove and with a vertical locking-recess leading downward from the forward end of the said groove, a forestock tie-piece located in the said groove and formed at its forward end with a locking-lug entering the said locking-recess and provided at its rear end with a threaded shank entering the said receiver-extension, and a screw passing upward through the forestock and into the said lug for seating the same firmly in the said recess.

3. In a military shoulder-arm, the combination with the receiver thereof, of a forestock formed in the upper face of its rear end with a longitudinal groove and with a vertical locking-recess extending downward from the forward end of the said groove, a forestock tie-piece located in the said groove, connected at its rear end with the receiver and provided at its forward end with a lug entering the said locking-recess, the forward end of the said tie-piece being reduced in thickness over its rear end, and a vertically arranged screw passing through the forestock and entering the said lug for holding the same in the said locking-recess.

THOMAS C. JOHNSON.

Copies of this patent may be obtained for five cents each, by addressing the "Commissioner of Patents, Washington, D. C."